United States Patent
Tanaka

(10) Patent No.: US 10,837,328 B2
(45) Date of Patent: Nov. 17, 2020

(54) ENGINE

(71) Applicant: KUBOTA Corporation, Osaka (JP)

(72) Inventor: Tamon Tanaka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 81 days.

(21) Appl. No.: 15/834,393

(22) Filed: Dec. 7, 2017

(65) Prior Publication Data
US 2018/0179927 A1 Jun. 28, 2018

(30) Foreign Application Priority Data

Dec. 28, 2016 (JP) ................................. 2016-254811

(51) Int. Cl.
*F01M 11/03* (2006.01)
*F01M 5/00* (2006.01)
(Continued)

(52) U.S. Cl.
CPC ........... *F01M 11/03* (2013.01); *B01D 35/005* (2013.01); *B01D 35/306* (2013.01); *F01M 5/002* (2013.01);
(Continued)

(58) Field of Classification Search
CPC ........ F01M 11/03; F01M 11/02; F01M 5/002; F01M 2011/031; F01M 2011/033;
(Continued)

(56) References Cited

U.S. PATENT DOCUMENTS 3,223,197 A * 12/1965 Conover ................ F01M 11/03
184/6.28
3,353,590 A * 11/1967 Holman ................ F01M 5/002
165/297
(Continued)

FOREIGN PATENT DOCUMENTS

DE 102005011221 A1 9/2006
DE 102005012550 A1 9/2006
(Continued)

OTHER PUBLICATIONS

NPL_Pentastar3.6LV6_Oilcooler_Published_Dec. 22, 2014; Retreived from the internet Dec. 17, 2019; URL: https://prezi.com/ijeeedzmeegi/pentastar-36l-v6-lubrication-schematic/ (Year: 2014).*
(Continued)

*Primary Examiner* — Sizo B Vilakazi
*Assistant Examiner* — Brian R Kirby
(74) *Attorney, Agent, or Firm* — Panitch Schwarze Belisario & Nadel LLP

(57) ABSTRACT

An engine is provided which includes an oil gallery, a base attaching seat in an engine frame wall, and a base for component mounting attached to the base attaching seat. An oil cooler and an oil filter are mounted on the base for component mounting, and the base attaching seat is provided with an oil inlet communicating with an upstream-side passage of the oil gallery, and an oil outlet communicating with a downstream-side passage of the oil gallery. Attaching the base for component mounting to the base attaching seat allows engine oil flowing into the oil inlet of the base attaching seat from the upstream-side passage of the oil gallery to pass the base for component mounting, the oil cooler, and the oil filter, and flow out of the oil outlet of the base attaching seat to the downstream-side passage of the oil gallery.

3 Claims, 9 Drawing Sheets

(51) Int. Cl.
  *B01D 35/30* (2006.01)
  *B01D 35/00* (2006.01)
  *F01M 11/02* (2006.01)
(52) U.S. Cl.
  CPC ....... *F01M 11/02* (2013.01); *F01M 2011/031* (2013.01); *F01M 2011/033* (2013.01)
(58) Field of Classification Search
  CPC ... B01D 35/005; B01D 35/306; F28F 9/0282; F28F 2250/106; F28F 9/0246; F28F 2009/0297; F28D 9/005; F28D 7/0025
  USPC .............................. 123/196, 196 R, 196 AB
  See application file for complete search history.

(56) References Cited

U.S. PATENT DOCUMENTS

| | | | | |
|---|---|---|---|---|
| 3,830,289 A * | 8/1974 | Olson | F01M 11/03 | 165/51 |
| 4,324,213 A * | 4/1982 | Kasting | B01D 35/12 | 123/196 A |
| 4,423,708 A * | 1/1984 | Sweetland | F28F 9/0075 | 123/196 AB |
| 4,426,965 A * | 1/1984 | Patel | F01M 5/002 | 123/196 AB |
| 4,538,565 A * | 9/1985 | Hidaka | F01M 1/02 | 123/195 R |
| 4,696,339 A * | 9/1987 | Schwarz | F01M 1/10 | 123/41.33 |
| 4,922,871 A * | 5/1990 | Batzill | F01M 11/03 | 123/196 A |
| 4,995,448 A * | 2/1991 | Inagaki | F01M 5/002 | 123/196 AB |
| 5,006,237 A * | 4/1991 | Jones | B01D 35/306 | 123/196 A |
| 5,014,775 A * | 5/1991 | Watanabe | B01D 35/18 | 123/196 AB |
| 5,099,912 A * | 3/1992 | Tajima | F28D 9/0012 | 165/133 |
| 5,199,395 A * | 4/1993 | Mizumura | F01M 1/10 | 123/196 A |
| 5,333,578 A * | 8/1994 | Shimura | F01M 1/10 | 123/90.17 |
| 5,351,664 A * | 10/1994 | Rotter | B01D 35/18 | 123/196 AB |
| 5,464,056 A * | 11/1995 | Tajima | F28D 9/0012 | 123/196 AB |
| 5,544,699 A * | 8/1996 | Robers | F01M 1/20 | 165/103 |
| 5,647,306 A * | 7/1997 | Pateman | F01M 5/002 | 123/41.33 |
| 5,647,315 A * | 7/1997 | Saito | F01M 11/0004 | |
| 5,771,854 A * | 6/1998 | Barton | F01M 1/02 | 123/196 R |
| 5,887,561 A * | 3/1999 | Spurgin | B01D 35/18 | 123/196 AB |
| 6,016,784 A * | 1/2000 | Tanaka | F01M 11/03 | 123/196 A |
| 6,263,962 B1 * | 7/2001 | Komoda | B01D 27/005 | 165/167 |
| 6,814,133 B2 * | 11/2004 | Yamaguchi | F28D 9/0012 | 123/196 A |
| 6,988,919 B2 * | 1/2006 | Tanaka | B63H 21/14 | 440/880 |
| 7,007,749 B2 * | 3/2006 | Brost | F28D 9/0012 | 165/167 |
| 7,353,794 B2 * | 4/2008 | Gruner | B01D 35/18 | 123/196 AB |
| 7,621,251 B1 * | 11/2009 | Courant | F01M 11/03 | 123/196 AB |
| 8,186,328 B2 * | 5/2012 | Kiemlen | F01M 11/03 | 123/196 AB |
| 8,844,611 B2 * | 9/2014 | Yao | F28D 9/0056 | 165/167 |
| RE45,853 E * | 1/2016 | Neal | F01M 5/00 | |
| 2006/0219208 A1 * | 10/2006 | Chonan | F01M 5/002 | 123/196 AB |
| 2007/0175434 A1 * | 8/2007 | Gruner | F01M 11/03 | 123/196 A |
| 2009/0038580 A1 * | 2/2009 | Hamilton | F28F 3/048 | 123/196 AB |
| 2010/0206516 A1 * | 8/2010 | Muller-Lufft | F28D 9/005 | 165/96 |
| 2012/0090811 A1 * | 4/2012 | Lemley | F28F 9/0251 | 165/51 |
| 2013/0167785 A1 * | 7/2013 | Palazzolo | F01M 11/02 | 123/41.33 |
| 2014/0020866 A1 * | 1/2014 | Bluetling | F28F 3/00 | 165/104.19 |
| 2017/0167330 A1 * | 6/2017 | Lee | F01M 11/0004 | |
| 2019/0085788 A1 * | 3/2019 | Kashiwa | F02F 7/0073 | |

FOREIGN PATENT DOCUMENTS

| | | | | |
|---|---|---|---|---|
| EP | 0750099 A2 | | 12/1996 | |
| EP | 0816645 A1 * | | 1/1998 | ............. F01M 11/03 |
| EP | 1876406 A1 * | | 1/2008 | ............. F01M 11/03 |
| FR | 2871516 A1 | | 12/2005 | |
| JP | 55104511 A * | | 8/1980 | ............. F01M 11/03 |
| JP | 2005273484 A * | | 10/2005 | ............. F28D 9/005 |
| JP | 2008533368 A | | 8/2008 | |
| JP | 2009103360 A * | | 5/2009 | |
| JP | 2011058480 A | | 3/2011 | |
| JP | 2011220643 A * | | 11/2011 | ............. F28D 9/005 |

OTHER PUBLICATIONS

NPL_Pentastar3.6LV6_OilcoolerModule_Published_Apr. 1, 2011; Retreived from the internet Dec. 17, 2019; URL: https://www.compositesworld.com/articles/under-the-hood-thermoplastics-tackle-tough-jobs (Year: 2011).*

Extended European Search Report dated May 24, 2018 in EP Application No. 17202355.8.

Office Action dated Sep. 24, 2019 in JP Application No. 2016-254811.

* cited by examiner

ENGINE

CROSS-REFERENCE TO RELATED APPLICATION

This application claims priority under 35 U.S.C. § 119(b) to Japanese Patent Application No. 2016-254811, filed Dec. 28, 2016, the disclosure of which is incorporated herein by reference in its entirety.

BACKGROUND OF THE INVENTION (1) Field of the Invention

The present invention relates to an engine.

(2) Description of Related Art

Conventionally, when the oil cooler is mounted on an engine, the additional processing for the drilled hole opening a communication passage configured to communicate the oil cooler and the oil filter in a crank case is performed.

Further, since the oil cooler and the oil filter need to be mounted individually on the engine, the component mounting work is complicated.

SUMMARY OF THE INVENTION

An object of the present invention is to provide an engine that does not require additional processing at the time of component mounting, and component mounting work of which is also easy.

In an engine with an oil cooler and an oil filter, the engine includes an oil gallery, a base attaching seat provided in an engine frame wall, and a base for component mounting attached to the base attaching seat, wherein the oil cooler and the oil filter are mounted on the base for component mounting, and the base attaching seat is provided with an oil inlet communicating with an upstream-side passage of the oil gallery, and an oil outlet communicating with a downstream-side passage of the oil gallery, and by attaching the base for component mounting to the base attaching seat, engine oil flowing into the oil inlet of the base attaching seat from the upstream-side passage of the oil gallery passes the base for component mounting, the oil cooler, and the oil filter, and flows out of the oil outlet of the base attaching seat to the downstream-side passage of the oil gallery.

The claimed invention exerts the following effects.

Additional processing for a drilled hole is not required at the time of component mounting.

Component mounting work becomes easy.

BRIEF DESCRIPTION OF THE DRAWINGS

FIG. 4C is a cross-sectional view along C-C line in FIG. 4A;

DETAILED DESCRIPTION OF PREFERRED EMBODIMENTS

FIGS. 1 to 9 are views for describing an engine according to an embodiment of the present invention, and in this embodiment, a vertical water-cooled multi-cylinder diesel engine will be described.

An outline of this engine is as follows.

Figure 5:
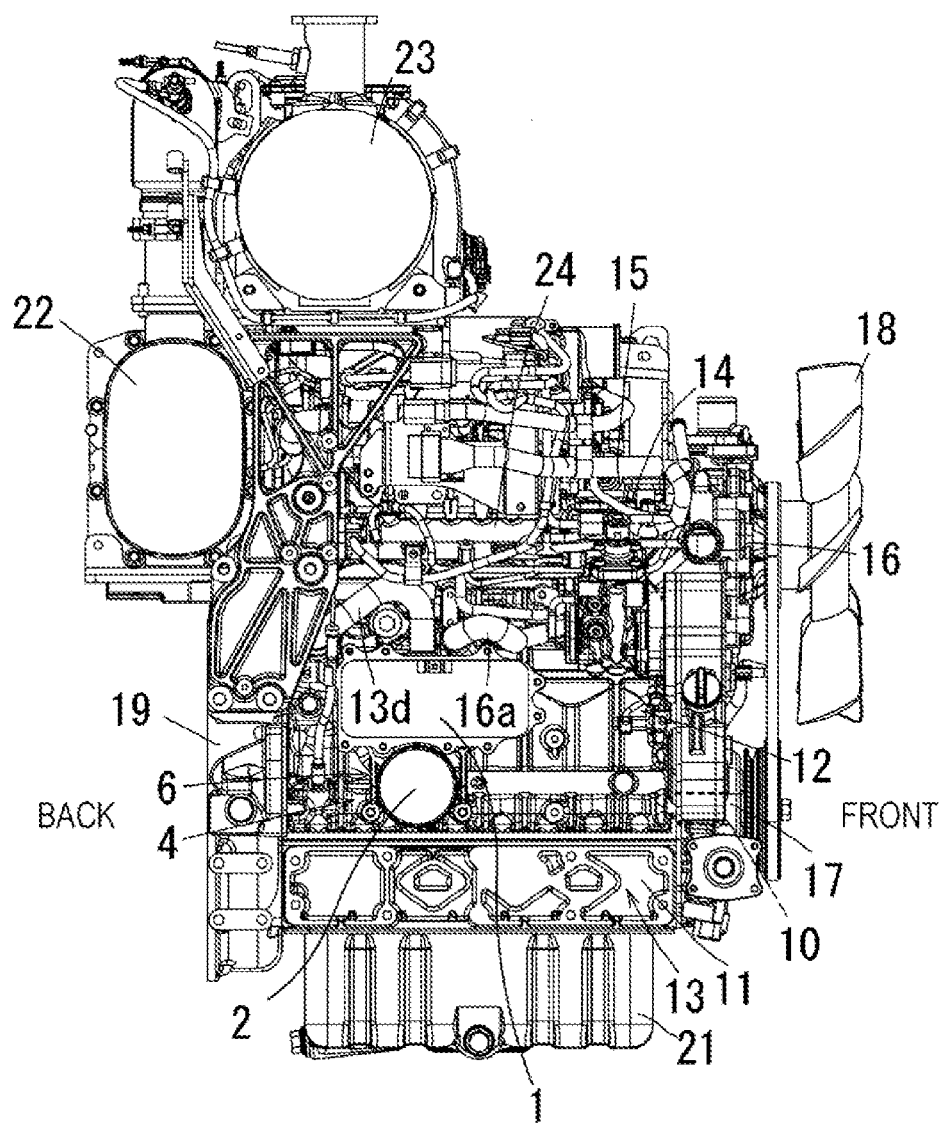
FIG. 5 is a right side view of the engine in FIG. 1.
Figure 6:
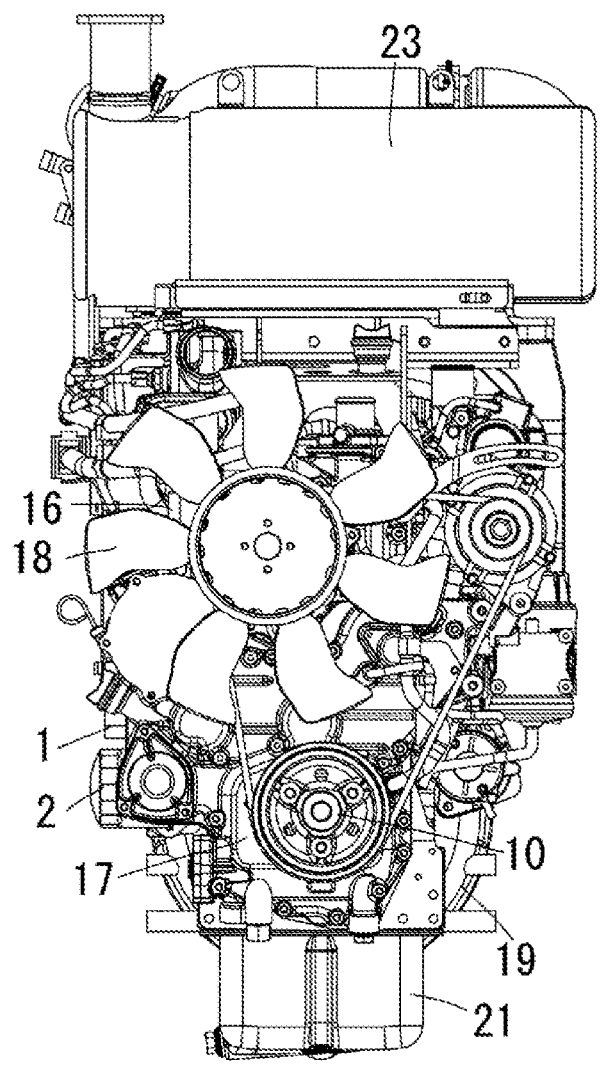
FIG. 6 is a front view of the engine in FIG. 1.
Figure 7:
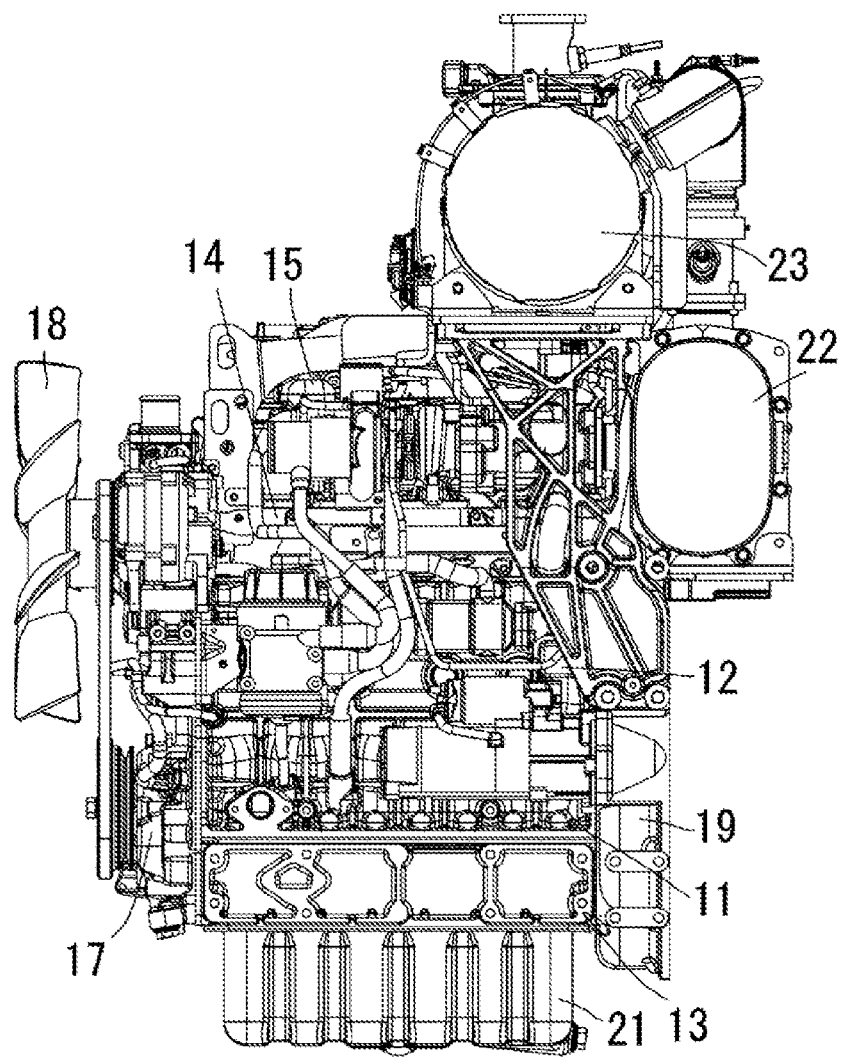
FIG. 7 is a left side view of the engine in FIG. 1.
Figure 8:
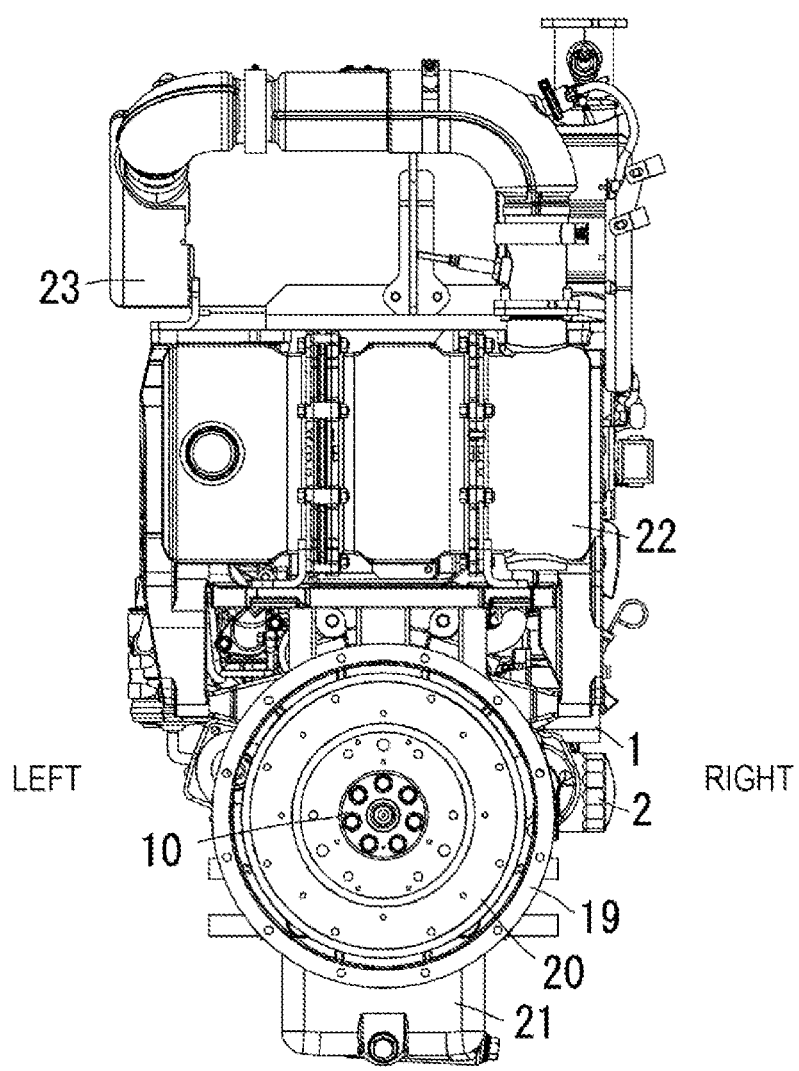
FIG. 8 is a back view of the engine in FIG. 1.
Figure 9:
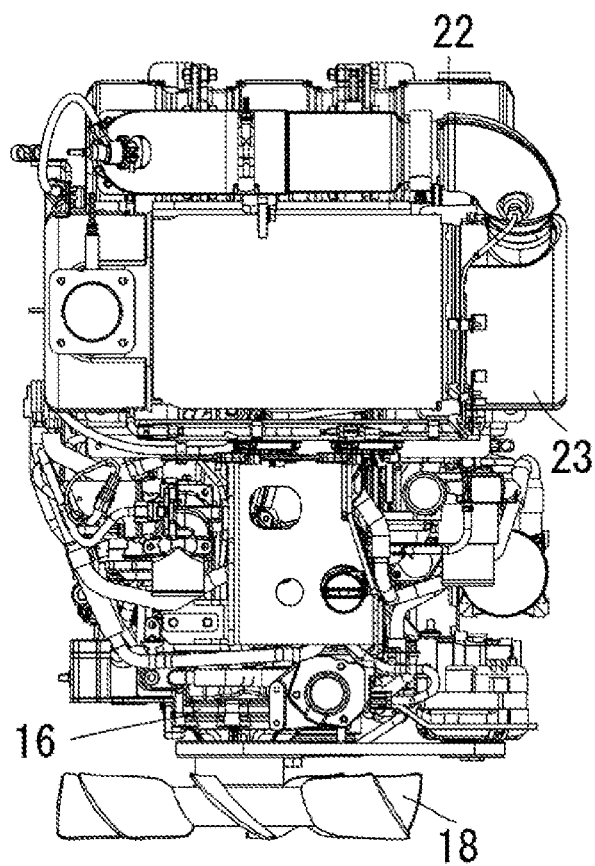
FIG. 9 is a plan view of the engine in FIG. 1.

As shown in FIG. 5, an installation direction of a crank shaft 10 is defined as a front-back direction, and one thereof is front, and the other is back, and as shown in FIG. 8, when viewed in a direction parallel to the installation direction of the crank shaft 10, a horizontal direction perpendicular to the front-back direction is defined as a right-left lateral direction, and a left-hand side when viewed from back to front is left, and a right-hand side is right.

As shown in FIGS. 5 to 9, this engine includes a cylinder block 13 in which a cylinder portion 12 is integrally formed above a crank case 11, a cylinder head 14 assembled above the cylinder block 13, a cylinder head cover 15 assembled above the cylinder head 14, a water pump 16 and an oil pump 17 assembled in front of the cylinder block 13, an engine cooling fan 18 disposed in front of the water pump 16, a flywheel housing 19 disposed in back of the cylinder block 13, a flywheel 20 disposed inside the flywheel housing 19, and an oil pan 21 assembled under the cylinder block 13.

As shown in FIG. 5, a DPF case 22 containing a DPF is disposed just behind the cylinder head 14, and an SCR case 23 containing an SCR catalyst is disposed just above a back portion of the cylinder head cover 15, and a common rail 24 is disposed on the right side of the cylinder head 14. The DPF is an abbreviation of a diesel engine particulate filter, and catches PM in exhaust. The PM is an abbreviation of particulate matter. The SCR is an abbreviation of selected catalytic reduction.

Figure 1:
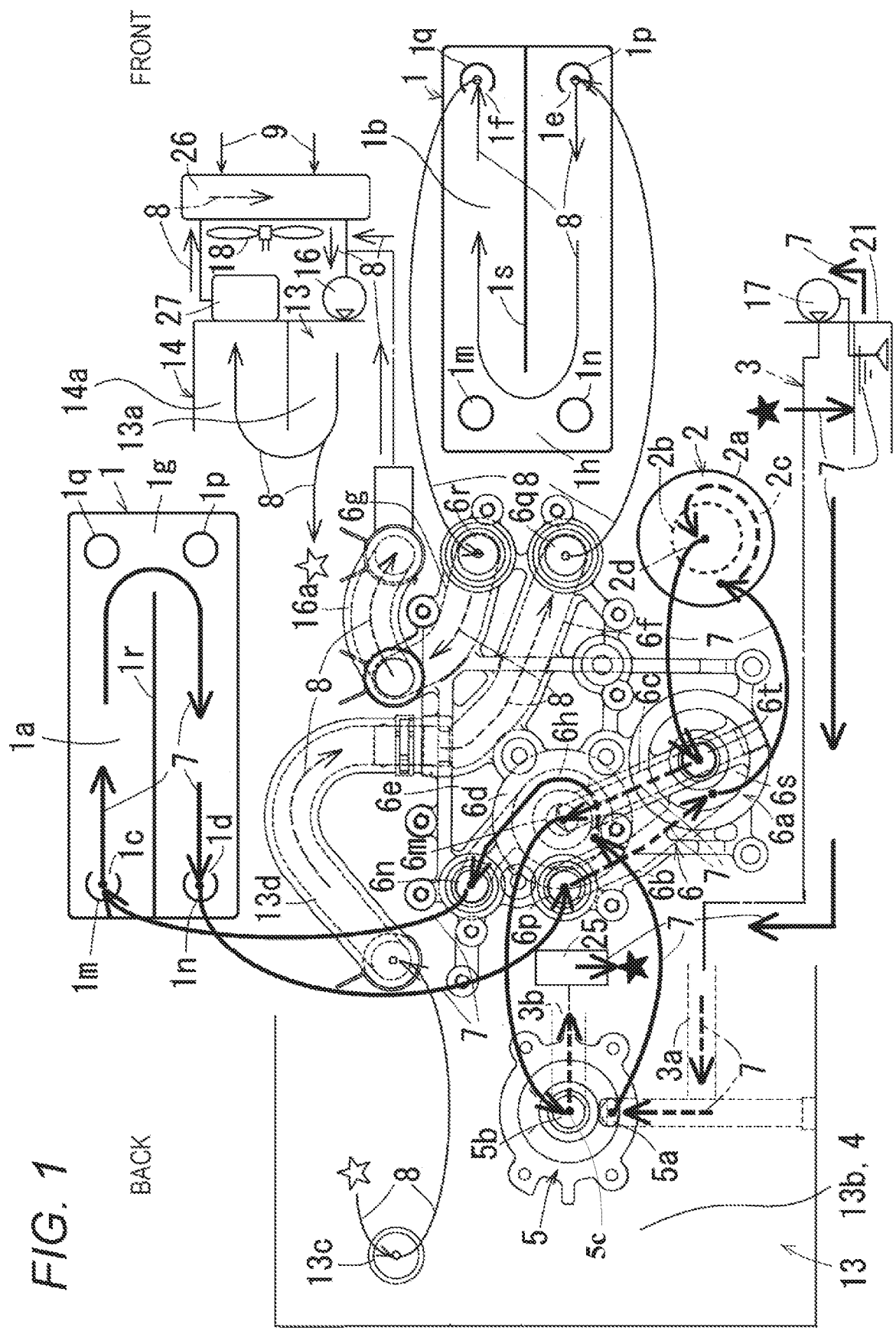
FIG. 1 is a schematic view of a substantial portion of an engine according to an embodiment of the present invention.

As shown in FIG. 1, this engine includes an oil cooler 1, an oil filter 2, an oil gallery 3, a base attaching seat 5 provided in an engine frame wall 4, and a base for component mounting 6 attached to the base attaching seat 5, wherein the oil cooler 1 and the oil filter 2 are mounted on the base for component mounting 6, the base attaching seat 5 is provided with an oil inlet 5a communicating with an upstream-side passage 3a of the oil gallery 3, and an oil outlet 5b communicating with a downstream-side passage 3b of the oil gallery 3.

As shown in FIG. 1, a configuration is such that by attaching the base for component mounting 6 to the base attaching seat 5, engine oil 7 flowing into the oil inlet 5a of the base attaching seat 5 from the upstream-side passage 3a of the oil gallery 3 passes the base for component mounting 6, the oil cooler 1, and the oil filter 2, and flows out of the oil outlet 5b of the base attaching seat 5 to the downstream-side passage 3b of the oil gallery 3.

The above-described configuration makes unnecessary additional processing of a drilled hole at the time of component mounting. A reason for this is that as shown in FIG.

1, only attaching the base for component mounting 6 to the base attaching seat 5 allows the engine oil 7 to pass the oil cooler 1 and the oil filter 2.

Moreover, the component mounting work becomes easy. A reason for this is that by mounting the oil cooler 1 and the oil filter 2 on the base for component mounting 6 beforehand in a subline of engine manufacturing, it suffices to only attach the base for component mounting 6 to the base attaching seat 5 in a main line.

The base attaching seat 5 is configured so that the oil filter 2 can be attached thereto in place of the base for component mounting 6, and when the oil filter 2 is attached to the base attaching seat 5, the engine oil 7 flowing into the oil inlet 5a of the base attaching seat 5 from the upstream-side passage 3a of the oil gallery 3 passes the oil filter 2, and flows out of the oil outlet 5b of the base attaching seat 5 to the downstream-side passage 3b of the oil gallery 3.

Therefore, if the oil cooler 1 is unnecessary, the base attaching seat 5 can be used as an oil filter attaching seat, and diversion of the cylinder block 13 to a model without the oil cooler 1 becomes easy.

As shown in FIGS. 1 and 5, the oil cooler 1 and the oil filter 2 are disposed above and below, and as shown in FIG. 1, the oil filter 2 on a lower side is located at a lower position than the oil inlet 5a and the oil outlet 5b of the base attaching seat 5. Thus, even if the engine oil 7 inside the oil gallery 3 flows down to the oil pan after the engine stops, the engine oil 7 inside the oil filter 2 is retained, and at the next engine start time, the oil gallery 3 is filled with the engine oil 7 in a short time, and the engine oil 7 is early supplied to a sliding portion 25 of the engine such as a bearing of the crank shaft 10 and the like, which can prevent burning of the sliding portion 25 due to lack of lubrication. Additionally, the oil cooler 1 is disposed in a position where the oil cooler 1 overlaps the seating portion 6d of the base for component mounting 6 such that the seating portion 6d being seated on the base attaching seat 5 when viewed in a direction parallel to a central axis 5c of the base attaching seat 5.

As shown in FIG. 1 and FIGS. 4A to 4C, the oil cooler 1 is formed longitudinally, and includes oil passages 1a, cooling water passages 1b in contact with the oil passages 1a, an oil passage inlet 1c and an oil passage outlet 1d each communicating with each of the oil passages 1a on one end side in a longitudinal direction, and a cooling water passage inlet 1e and a cooling water passage outlet 1f each communicating with each of the cooling water passages 1b on another end side in the longitudinal direction, and is configured such that the engine oil 7 flowing in from the oil passage inlet 1c on the one end side in the longitudinal direction is inverted at an oil passage inversion portion 1g on the other end portion in the longitudinal direction, and flows out of the oil passage outlet 1d on the one end side in the longitudinal direction, while cooling water 8 flowing in from the cooling water passage inlet 1e on the other end side in the longitudinal direction is inverted at a cooling water passage inversion portion 1h on the one end side in the longitudinal direction, and flows out of the cooling water passage outlet 1f on the other end side in the longitudinal direction.

This makes long a passage route of the engine oil 7 and the cooling water 8 inside the oil cooler 1, and promotes heat exchange between the engine oil 7 and the cooling water 8, so that cooling efficiency of the engine oil 7 becomes high.

As shown in FIG. 1 and FIGS. 3A, 3B and 3C, the base for component mounting 6 includes an oil filter attaching seat 6a, an upstream-side oil passage 6b on an upstream side of an oil flow channel with respect to the oil filter attaching seat 6a, and a downstream-side oil passage 6c on a downstream side of the oil flow channel with respect to the oil filter attaching seat 6a, wherein the upstream-side oil passage 6b is formed of a casted hole with a casting surface remaining in an inner circumferential surface thereof, and the downstream-side oil passage 6c is formed of a drilled hole.

This can reduce a manufacturing cost of the base for component mounting 6 because the upstream-side oil passage 6b can be formed of the casted hole, and further, even if casting sand remaining in the inner circumferential surface of the upstream-side oil passage 6b comes off, this casting sand is caught in the oil filter 2, and does not flow out to the downstream side of the oil flow channel, so that a flaw due to coming-off of the casting sand can be prevented.

As shown in FIG. 1, a cooling device of this engine includes a water jacket made up of a cylinder jacket 13a inside the cylinder block 13 and a head jacket 14a inside the cylinder head 14, the water pump 16 configured to pressure-feed the cooling water 8 to the cylinder jacket 13a, a thermostat housing 27 configured to lead out the cooling water 8 flowing into the head jacket 14a from the cylinder jacket 13a, a radiator 26 configured to introduce the cooling water 8 from the thermostat housing 27, and an engine cooling fan 18 configured to introduce engine cooling air 9 to the radiator 26.

Figure 2:
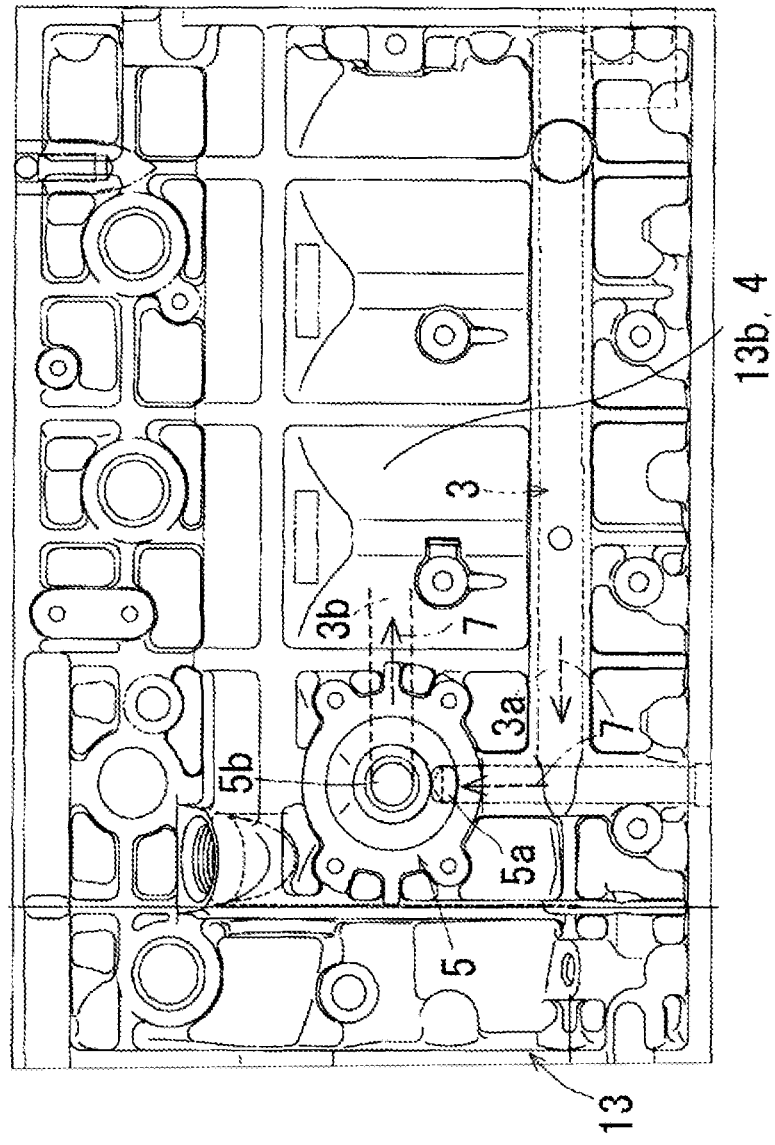
FIG. 2 is a side view of a cylinder block of the engine in FIG. 1.
Figure 3A:
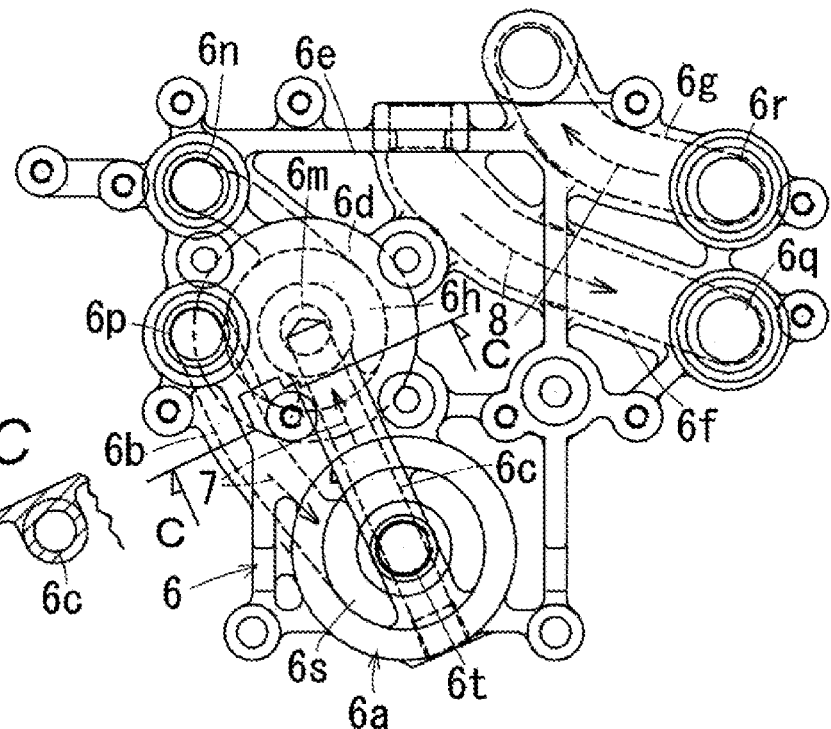
FIGS. 3A to 3C are views for describing a base for component mounting used in the engine in FIG. 1, FIG. 3A being a front view, FIG. 3B being a back view, and FIG. 3C being a cross-sectional view along C-C line in FIG. 3A.
Figure 3C:
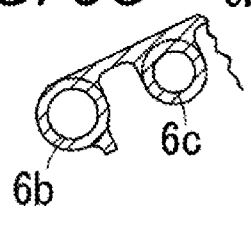
Figure 3B:
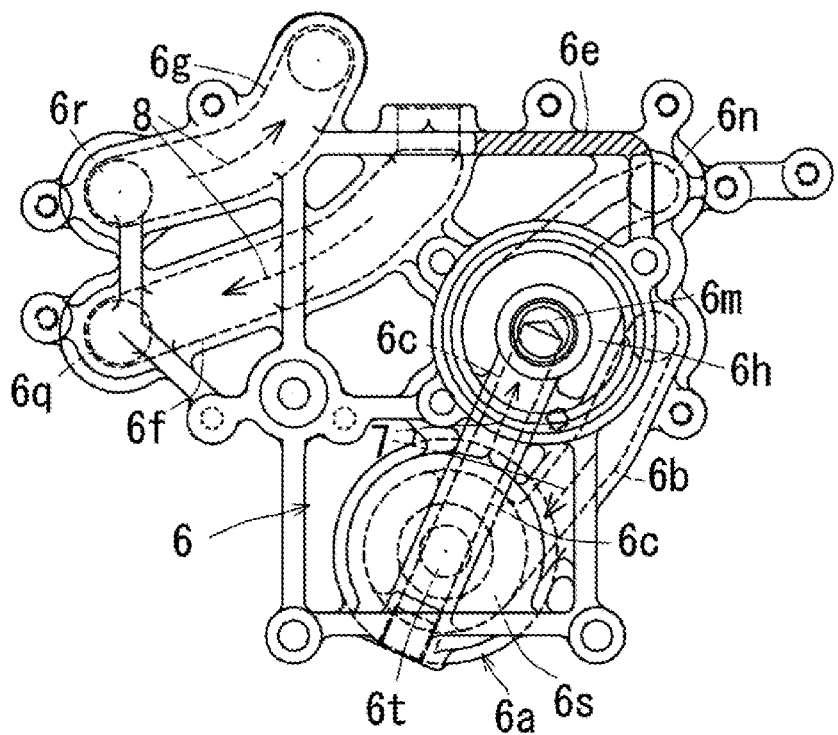
Figure 4A:
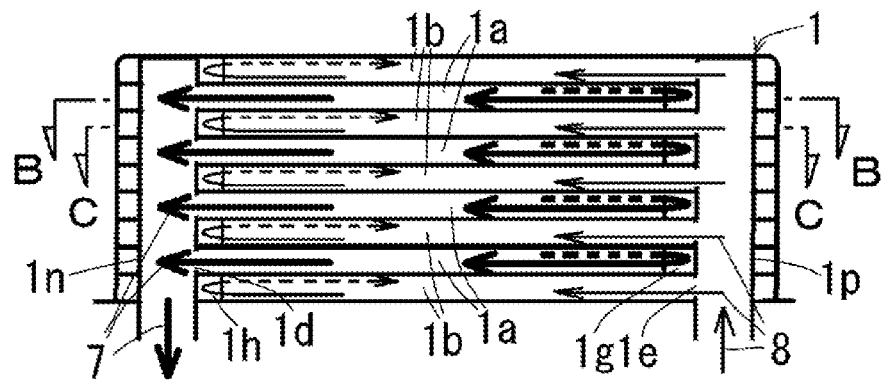
FIGS. 4A to 4C are views for describing an oil cooler used in the engine in FIG. 1, FIG. 4A being a longitudinal section bottom view, FIG. 4B being a cross-sectional view along B-B line in FIG. 4A.
Figure 4B:
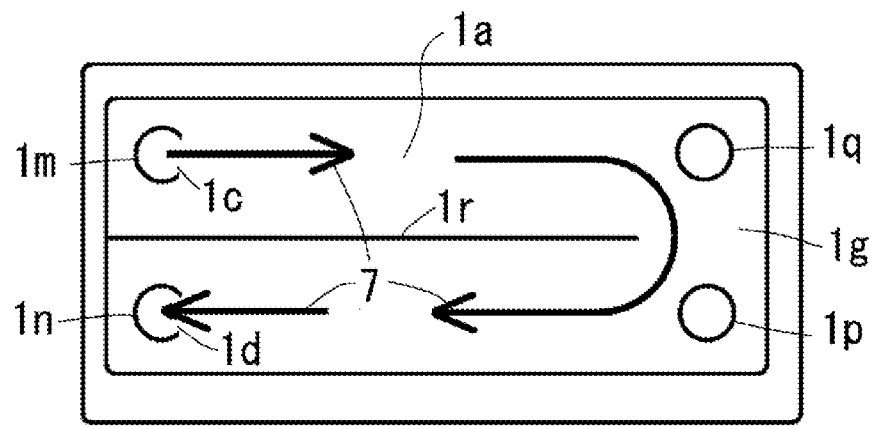
Figure 4C:
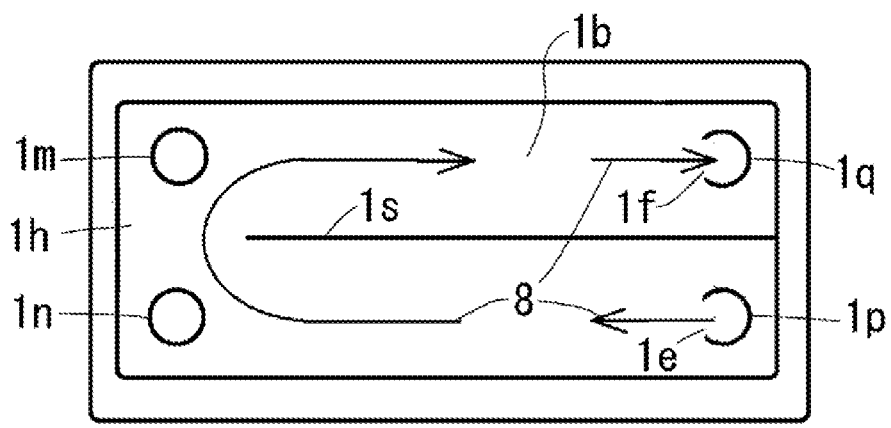

As shown in FIGS. 1 and 2, a lubricating device of this engine includes the oil pump 17 disposed in front of the cylinder block 13, the oil gallery 3 internally provided in a cylinder block wall 13b of the cylinder block 13, the base attaching seat 5 provided in an outer surface of the cylinder block wall 13b of the cylinder block 13, the base for component mounting 6 attached to the base attaching seat 5, and the oil cooler 1 and the oil filter 2 mounted on the base for component mounting base 6.

As shown in FIG. 1 and FIGS. 3A to 3C, the base for component mounting 6 includes a seating portion 6d configured to seat the base attaching seat 5 of the cylinder block 13 thereon, an oil cooler attaching seat 6e configured to attach the oil cooler 1 thereto, an oil filter attaching seat 6a configured to attach the oil filter 2 thereto, an upstream-side oil passage 6b, a downstream-side oil passage 6c, an upstream-side cooling water passage 6f, and a downstream-side cooling water passage 6g.

As shown in FIG. 1 and FIGS. 4A to 4C, the oil cooler 1 includes the plurality of oil passages 1a and the plurality of cooling water passages 1b, which are each layered alternately, an oil inlet pipe 1m provided with the oil passage inlets 1c of the oil passages 1a, an oil outlet pipe 1n provided with the oil passage outlets 1d of the oil passages 1a, a cooling water inlet pipe 1p provided with cooling water passage inlets 1e of the cooling water passages 1b, and a cooling water outlet pipe 1q provided with the cooling water passage outlets 1f of the cooling water passages 1b.

As shown in FIG. 1 and FIGS. 4A to 4C, the oil inlet pipe 1m and the oil outlet pipe 1n are disposed vertically on the one end side in the longitudinal direction (a back end side) of the oil passages 1a, and an oil passage partition wall 1r is led out of an inner wall surface on the one end side (the back side) of each of the oil passages 1a to the other end side (a front end side), so that this oil passage partition wall 1r vertically partitions the oil passage 1a, and the oil passage inversion portion 1g is formed on the other end side (the front end side) of the oil passage 1a.

In this oil cooler 1, the engine oil 7 flowing into an upper one end side (an upper back end side) of the oil passage 1a from the oil passage inlet 1c of the oil inlet pipe 1m advances to the other end side (the front end side) inside an upper partition passage, is inverted to the one end side (the back end side) at the oil passage inversion portion 1g, advances to the one end side (the back end side) inside a lower partition passage, and flows out of the oil passage outlet 1d of the oil outlet pipe 1n on a lower one end side (a lower back end side) of the oil passage 1a.

As shown in FIG. 1 and FIGS. 4A to 4C, the cooling water outlet pipe 1q and the cooling water inlet pipe 1p are disposed vertically on the other end side in the longitudinal direction (the front side) of the cooling water passages 1b, and a cooling water passage partition wall 1s is led out of an inner wall surface on the other end side (the front side) of each of the cooling water passages 1b to the one end side (the back side), so that this cooling water passage partition wall is vertically partitions the cooling water passage 1b, and the cooling water passage inversion portion 1h is formed on the one end side (the back side) of the cooling water passage 1b.

In this oil cooler 1, the cooling water 8 flowing into a lower other end side (a lower front end side) of the cooling water passage 1b from the cooling water passage inlet 1e of the cooling water inlet pipe 1p advances to the one end side (the back end side) inside a lower partition passage, is inverted to the other end side (the front end side) at the cooling water passage inversion portion 1h, advances to the other end side (the front end side) inside an upper partition passage, and flows out of the cooling water passage outlet 1f of the cooling water outlet pipe 1q on an upper other end side (an upper front end side) of the cooling water passage 1b.

As shown in FIG. 1, the oil filter 2 includes a cylindrical cup-shaped casing 2a, a cylindrical filter element 2b disposed concentrically inside the casing 2a, an unpurified oil chamber 2c closer to an outer circumference of the casing 2a partitioned by the filter element 2b, and a purified oil chamber 2d on a central side of the casing 2a.

As shown in FIG. 1 and FIGS. 3A to 3C, the seating portion 6d of the base for component mounting 6 includes an oil inlet chamber 6h closer to an outer circumference, the oil inlet chamber 6h being connected to the oil inlet 5a of the base attaching seat 5, and a base final oil outlet 6m on a central side, the base final oil outlet 6m being connected to the oil outlet 5b of the base attaching seat 5.

As shown in FIG. 1 and FIGS. 3A to 3C, the oil cooler attaching seat 6e includes an oil outlet 6n of the oil inlet chamber 6h into which the oil inlet pipe 1m of the oil cooler 1 is inserted, a reentry oil inlet 6p into which the oil outlet pipe 1n of the oil cooler 1 is inserted, the upstream-side cooling water passage 6f connected to a cooling water discharge hose 13d on a cooling water outlet 13c side of the cylinder jacket 13a, the downstream-side cooling water passage 6g connected to a cooling water suction hose 16a on a wager pump 16 side, the cooling water outlet 6q of the upstream-side cooling water passage 6f into which the cooling water inlet pipe 1p of the oil cooler 1 is inserted, and a cooling water inlet 6r of the downstream-side cooling water passage 6g into which the cooling water outlet pipe 1q of the oil cooler 1 is inserted.

As shown in FIG. 1 and FIGS. 3A to 3C, the oil filter attaching seat 6a includes an oil inlet chamber 6s closer to an outer circumference, and an oil outlet 6t in a central portion, wherein the reentry oil inlet 6p of the oil cooler attaching seat 6e and the oil inlet chamber 6s of the oil filter attaching seat 6a are communicated by the upstream-side oil passage 6b, and the oil inlet chamber 6s is communicated with the unpurified oil chamber 2c of the oil filter 2, the purified oil chamber 2d of the oil filter 2 and the oil outlet 6t of the oil filter attaching seat 6a are communicated, and this oil outlet 6t and the base final oil outlet 6m of the seating portion 6d are communicated by the downstream-side oil passage 6c.

As shown in FIG. 1, the engine oil 7 inside the oil pan 21 sequentially passes through the oil pump 17, the upstream-side passage 3a of the oil gallery 3, the oil inlet 5a of the base attaching seat 5, the oil inlet chamber 6h of the seating portion 6d of the base for component mounting 6, the oil outlet 6n, the oil inlet pipe 1m of the oil cooler 1, the oil passage 1a, the oil outlet pipe 1n, the reentry oil inlet 6p of the oil cooler attaching seat 6e, the upstream-side oil passage 6b, the oil inlet chamber 6s of the oil filter attaching seat 6a, the unpurified oil chamber 2c of the oil filter 2, the filter element 2b, the purified oil chamber 2d, the oil outlet 6t of the oil filter attaching seat 6a, the downstream-side oil passage 6c, the base final oil outlet 6m, the oil outlet 5b of the base attaching seat 5, the downstream-side passage 3b of the oil gallery 3, and the sliding portion 25 such as the bearing of the crank shaft 10 and the like to return to the oil pan 21.

As shown in FIG. 1, the cooling water 8 inside the cylinder jacket 13a sequentially passes through the head jacket 14a, the thermostat housing 27, the radiator 26, and the water pump 16 to return to the cylinder jacket 13a, while part of the cooling water 8 sequentially passes through the cooling water outlet 13c of the cylinder jacket 13a, the cooling water discharge hose 13d, the upstream-side cooling water passage 6f of the oil cooler attaching seat 6e, the cooling water inlet pipe 1p of the oil cooler 1, the cooling water passage 1b, the cooling water outlet pipe 1q, the cooling water inlet 6r, the downstream-side cooling water passage 6g, the cooling water suction hose 16a, and the water pump 16 to return to the cylinder jacket 13a.

What is claimed is:

1. An engine with an oil cooler and an oil filter comprising: an oil gallery; a base attaching seat provided in an engine frame wall; and a base for component mounting attached to the base attaching seat; wherein the oil cooler and the oil filter are mounted on the base for component mounting, and the base attaching seat is provided with an oil inlet communicating with an upstream-side passage of the oil gallery, and an oil outlet communicating with a downstream-side passage of the oil gallery, and by attaching the base for component mounting to the base attaching seat, engine oil flowing into the oil inlet of the base attaching seat from the upstream-side passage of the oil gallery passes the base for component mounting, the oil cooler, and the oil filter, and flows out of the oil outlet of the base attaching seat to the downstream-side passage of the oil gallery, the base for component mounting includes a seating portion configured to seat the base attaching seat thereon and an oil cooler attaching seat configured to attach the oil cooler thereto, the seating portion of the base for component mounting includes an oil inlet chamber connected to the oil inlet of the base attaching seat, and the oil cooler attaching seat includes an oil outlet of the oil inlet chamber into which the oil inlet pipe of the oil cooler is inserted and a reentry oil inlet into which the oil outlet pipe of the oil cooler is inserted, the oil cooler is disposed in a position where the oil cooler overlaps the seating portion of the base for component mounting, the seating portion being seated on the base attaching seat, when viewed in a direction parallel to a central axis of the base attaching seat, and when viewed in the direction parallel to the central axis of the base attaching seat, the oil outlet of the base attaching seat is disposed at a place higher than the oil filter, at a position overlapping a lowered side of the oil cooler; wherein the base attaching seat is configured so that the oil filter can be attached thereto in place of the base for component mounting, and when the oil filter is attached to the base attaching seat, the engine oil flowing into the oil inlet of the base attaching seat from the upstream-side passage of the oil gallery passes the oil filter, and flows out of the oil outlet of the base attaching seat to the downstream-side passage of the oil gallery.

2. The engine according to claim 1, wherein the oil cooler is formed longitudinally, and includes oil passages, cooling water passages in contact with the oil passages, an oil passage inlet and an oil passage outlet each communicating with each of the oil passages on one end side in a longitudinal direction, and a cooling water passage inlet and a cooling water passage outlet each communicating with each of the cooling water passages on another end side in the longitudinal direction, and the engine oil flowing in from the oil passage inlet on the one end side in the longitudinal direction is inverted at an oil passage inversion portion on the other end side in the longitudinal direction, and flows out of the oil passage outlet on the one end side in the longitudinal direction, while cooling water flowing in from the cooling water passage inlet on the other end side in the longitudinal direction is inverted at a cooling water passage inversion portion on the one end side in the longitudinal direction, and flows out of the cooling water passage outlet on the other end side in the longitudinal direction.

3. The engine according to claim 1, wherein the base for component mounting includes an oil filter attaching seat, an upstream-side oil passage on an upstream side of an oil flow channel with respect to the oil filter attaching seat, and a downstream-side oil passage on a downstream side of the oil flow channel with respect to the oil filter attaching seat, and the upstream-side oil passage is formed of a casted hole with a casting surface remaining in an inner circumferential surface thereof, and the downstream-side oil passage is formed of a drilled hole.

* * * * *